3,362,788
PREPARATION OF CRYSTALLINE CARBONACEOUS MATERIALS

James L. Lauer, Penn Wynne, Pa., assignor to Sun Oil Company, Philadelphia, Pa., a corporation of New Jersey
No Drawing. Filed Aug. 26, 1963, Ser. No. 304,621
21 Claims. (Cl. 23—209.1)

This invention relates to the conversion of certain types of hydrocarbons under reaction conditions whereby colorless carbonaceous materials which are crystalline are formed. Products which can be produced in accordance with the invention comprise crystalline materials which are optically isotropic including diamond and high melting crystalline carbonaceous materials composed preponderantly of carbon but also including a minor amount of hydrogen.

Numerous attempts have been made heretofore to synthesize diamond from non-diamond forms of carbon, and much of this work has been summarized by F. P. Bundy in J. Chem. Phys., vol. 38, No. 3, pages 631–643 (1963). The usual procedure employed has comprised subjecting a non-diamond form of carbon such as graphite to high temperatures above 1200° C. and extremely high pressures such as pressures in excess of 60,000 atmospheres. Within recent years this procedure has been successful in producing diamond, as shown in the above-mentioned article by Bundy and by United States Patent Nos. 2,947,608–611 inclusive and No. 2,941,248. However considerable difficulties have been experienced in designing apparatus in which the necessary high temperatures and extreme pressures can be applied to the starting carbonaceous material so as to convert it into diamond.

Another procedure proposed for growing diamond, as disclosed in United States Patent No. 3,030,188, comprises providing diamond seed crystals and contacting the seed crystals with a gas which is decomposable to free methyl radicals. Conditions employed for effecting diamond growth on the seed crystals include temperatures in the range of 600–1600° C. and a low pressure such as less than 2 mm. Hg absolute. Still another procedure, as described in United States Patent No. 3,030,187 involves again providing diamond seed crystals and contacting such crystals with CO or a mixture of CO and $CO_2$ at a temperature in the range of 600–1600° C. and a pressure in the range of 1000–2000 p.s.i.g.

It has now been found that diamond can be produced from certain types of hydrocarbons by reaction of certain vapor phase reactants therewith under conditions requiring neither the use of high pressures nor the presence of diamond seed crystals. It has now also been found that, under the conditions of the present process, a novel type of crystalline carbonaceous material which is optically isotropic, colorless and high melting can also be formed. While it is not known with certainty, this carbonaceous material may be an intermediate form of carbon between the starting hydrocarbon and diamond. The product crystals of such material are associated with the diamond product with the latter being attached to the surface of the crystalline intermediate material. Properties of this carbonaceous material are more fully described hereinafter.

According to the invention, crystalline carbonaceous materials which are optically isotropic and which include diamond are prepared by reacting certain types of hydrocarbons, as hereinafter more fully described, with a vapor phase reactant capable of forming a hydrogen-abstracting free radical. Such reactant can be oxygen, sulfur, halogens, carbon dioxide, nitric oxide, acetylene or methylacetylene. A stoichiometric deficiency of the reactant, based on the amount required for complete abstraction of hydrogen from the hydrocarbon charged, is employed and special reaction conditions are used such that hydrogen atoms of the hydrocarbon tend to react in preference to the carbon atoms. The conditions are such that an exceedingly fast reaction occurs, wherein hydrogen atoms are removed and at least part of the carbon-enriched moiety from the hydrocarbon rearranges to form carbonaceous material in which colorless crystals are dispersed. Actually, most of the carbonaceous residue from the starting hydrocarbon converts to amorphous carbon such as soot, and a minor amount to graphitic carbon. But from the product crystals of colorless carbonaceous material, which are intermingled with the sooty and graphitic carbon, can be separated. X-ray diffraction shows that this crystalline product includes diamond along with the novel crystalline carbonaceous material which is also colorless and optically isotropic. A portion of the diamond product has the usual cubic crystalline form. However, X-ray diffraction patterns also show the presence of a hexagonal crystalline form of diamond which, to applicant's knowledge, has never been actually produced heretofore. The possibility of such hexagonal form has been postulated by Ergun and Alexander in an article appearing in Nature, vol. 195, No. 4843, Aug. 25, 1962, pages 765–767. This new type of diamond represents a form in which a slight displacement of some of the carbon atoms from their positions in the normal cubic structure has occurred.

More specifically, the present process involves reacting a vapor phase reactant which is oxygen, sulfur, a halogen, $CO_2$, NO, acetylene or methylacetylene with certain types of hydrocarbons, the amount of the reactant being between 2% and 80%, more preferably between 10% and 30%, of the stoichiometric amount required for complete reaction with the hydrogen atoms of the charge hydrocarbon. The hydrocarbon is heated in the presence of the reactant in such deficient amount to a temperature above 250° C. The temperature reached during heating is sufficient to initiate a rapid exothermic reaction, which reaction after initiation occurs in less than 50 milliseconds and more preferably less than 5 milliseconds. The reaction preferably involves a detonation although this is not essential. The foregoing statement that the reaction occurs in less than 50 milliseconds is intended to mean that at any given locus within the reactor, once the reaction has started to occur at that particular locus, it will be completed there within the time interval specified. In cases where a long reaction tube is used, the detonation wave might require longer than 50 milliseconds to pass through the entire reaction mixture, but at any point along the tube the reaction once it starts will be complete in less than 50 milliseconds and preferably less than 5 milliseconds. During this short reaction interval the temperature within the vapor rises sharply and the reaction is completed in the sense that substantially all of the available reactant, i.e., oxygen, sulfur, halogen, etc., is consumed at the locus of reaction. Solid material resulting from the reaction collects on surfaces adjacent the reaction space. Most of this material is sooty carbon, but intermingled therewith are crystals of graphite and colorless crystals of optically isotropic carbonaceous material. The latter crystals are mainly the carbonaceous intermediate material previously referred to which, unlike diamond, will melt mainly in the range of 350–1200° C. However, diamond is also present, being carried on the surface of the crystals of carbonaceous intermediate material. The presence of diamond is clearly demonstrated by X-ray diffraction patterns which show the interplanar spacings characteristic of natural diamond as well as hexagonal diamond and by the standard Becke refractive index measurement which gives a refractive index slightly above 2.4 (Li, $\lambda=670.8$ m$\mu$) which value corresponds to the known refractive index of diamond. In addition numerous other interplanar spacings attributable to the meltable carbonaceous material are shown by the X-ray diffraction.

When the above-described reaction is carried out a single time, the crystals of diamond carried on the other crystalline material are small but are clearly detectable both by X-ray diffraction and by Becke refractive index measurements. However the reaction can then be repeated many times without removing the product from the reactor surfaces and the previously formed diamond crystals will function as seeds for the growth of larger diamond crystals. In these repetitive reactions additional amounts of the intermediate carbonaceous material carrying small crystals of diamond will continue to be formed, while at the same time growth of diamond crystals previously formed will occur. The reaction can be repeated until diamond crystals of useful size are obtained. The crystals can then be separated in any suitable manner from the sooty reaction products, such as by means of a micro-manipulator, and the diamond crystals can subsequently be separated from the intermediate carbonaceous material in view of the fact that the latter will melt whereas diamond will not at ordinary pressure.

The resulting diamond is useful for industrial purposes, e.g., as the abrasive ingredient in abrasive compositions and devices such as grinding wheels. The intermediate carbonaceous material can also be used for abrasive purposes, since crystals thereof are at least sufficiently hard to scratch glass. For various applications the diamond need not be separated from the other crystalline material and the two can be used together.

Only certain types of hydrocarbons can be utilized in preparing the crystalline carbonaceous products of the present invention. These are types whose molecular structures provide inherent restraints against rearrangement of the carbon skelton into an aromatic structure. Usually in the partial combustion of hydrocarbons the hydrocarbons or their partial combustion products tend to undergo thermal cracking which causes the formation of aromatic types and the aromatics tend to act as precursors for the formation of graphitic carbon. The hydrocarbons used in the present invention have structures that provide sufficient restraint so that at least some of the molecules, under the special conditions employed in the reaction, are inhibited from forming the aromatic precursors and thus do not convert into undesired forms of carbon. The rearrangement of the carbon atoms thus takes another path, proceeding toward an isometric arrangement of the carbon atoms and thereby resulting in the formation of diamond when sufficient hydrogen atoms have been extracted by reaction with the oxygen, sulfur, halogen or other reactant as above specified.

The hydrocarbon types utilized in practicing the present invention have the following characteristics:

(1) There must be no aromatic ring in the molecule.
(2) The molecule must have a non-planar structure.
(3) There must be at least two rings in the molecule.
(4) There must be at least one carbon atom which is common to two or more rings.

There are many hydrocarbons which conform to the foregoing requirements. These comprise condensed ring compounds as well as spiro compounds. Preferred hydrocarbons have at least two bridgehead carbon atoms with at least one methylene group therebetween, as typified by adamantane and its alkyl derivatives or by trimethylenenorbornane (tetrahydrocyclopentadiene or tricyclodecane) and its alkyl derivatives. Adamantanes and trimethylenenorbornanes are especially preferred for practicing the invention. The following are examples of other hydrocarbons conforming to the foregoing requirements: decalin, hydrindane, perhydrobenzonaphthene, perhydroanthracene, perhydroacenaphthene, perhydrohydrindacene, perhydrofluorene, perhydrohomotetraphthene, perhydrophenylnaphthalenes, perhydropyrene, perhydrochrysene, spiropentane, perhydroindane - 1 - spirocyclohexane, camphane, camphene, pinane, pinene, carene, caryophyllene, and alkyl derivatives of any of these hydrocarbons. It is also permissible to use derivatives of the foregoing hydrocarbons which contain groups such as OH, =O, NO, COOH, NH$_2$ and halogens. Such derivatives for the present purpose function in substantially the same manner as the hydrocarbons themselves and hence can be considered the equivalent thereof.

The proper conditions for effecting the present embodican be established in several ways. In a preferred embodiment the conditions are such that a detonation reaction occurs. This procedure can be carried out in a bomb or sealed glass tube. Assuming that oxygen is the reactant selected for effecting the reaction, an oxygen atmosphere is established in the bomb and a hydrocarbon meeting the structural requirements set forth above is added thereto in amount such that, upon its vaporization, a vapor mixture of explosive composition will result. The amount of oxygen in the mixture should be less than 80% of the stoichiometric amount required to react with the hydrogen atoms of the hydrocarbon, more preferably, 10–30% of such amount. The bomb is then heated sufficiently above 250° C. to cause a sudden detonation to occur. This detonation reaction generally occurs at a temperature below 300° C. if the boiling point of the hydrocarbon charged is below this level. If the reaction is conducted in a sealed tube, it can be seen to occur as a sudden flash and the reaction is completed, in the sense that substantially all the oxygen is consumed, in considerably less time than 5 milliseconds. As a result of the flash, a sooty deposit forms on the wall of the bomb. However, a small amount of the deposit, such as 0.3%, will be colorless crystalline material including diamond as previously described. Most of the crystals generally will have a size of the order of 10 microns, although some crystals may be as large as 70 microns. The bomb can then be recharged with an appropriate amount of hydrocarbon, filled with oxygen and again heated to effect another detonation in the same manner. This procedure can be repeated as many times as necessary to cause the diamond crystals to grow to a useful size. Thereafter the colorless crystalline material is separated from the sooty material as previously explained and, if desired, the diamond particles can be separated from the other crystalline material by preferential melting of the latter and filtration of the melt.

In another embodiment of the invention optically isotropic crystalline material is produced without any noticeable detonation reaction. The procedure involves placing a droplet of a hydrocarbon, or a chunk in the case of a solid hydrocarbon, having the characteristics set forth above on a hot surface such as a watch glass sitting on a hot plate. The surface should be maintained at a temperature above 250° C. such that nucleate boiling occurs, the boiling being done in the presence of oxygen (air) or in an atmosphere of any of the other reactants hereinbefore specified. Nucleate boiling as distinguished from film boiling has been described in numerous references, e.g., Handbook of Physics (1958), pages 5–75. It involves the formation of bubbles only at certain sensitive points adjacent the hot surface rather than the formation of a continuous vapor film between the hot surface and the boiling liquid. Thus when a droplet of the charge hydrocarbon is applied to a surface such as a watch glass maintained at an appropriate temperature, nucleate boiling occurs accompanied by turbulence of the droplet at the surface before all the liquid disappears. During this time the vapor phase reatcant, e.g., air, can, due to the turbulent condition, contact the hydrocarbon in the vapor space and react therewith, causing the formation of carbonaceous material which is left as a residue. This residue is largely sooty material but, as in the case of the previously described detonation reaction, also contains colorless crystalline carbonaceous material including diamond. After all the hydrocarbon liquid has disappeared from a drop additional drops or pieces are applied to the hot surface intermittently and the dropwise or piecewise addition of hydrocarbon is continued in this manner until a substantial amount of the carbonaceous residue is obtained. Thereafter most of the black portion of the residue can be removed by means of a solvent such as amyl acetate and the remaining residue largely will be clear crystals of the non-diamond and diamond forms of optically isotropic carbon.

In the last-described embodiment of the invention employing droplets of the charge hydrocarbon on a hot surface in contact with air and under conditions of nucleate boiling, it may be that the reaction mechanism involves a multitude of minute detonations in the vapor spaces beneath the turbulent drops although this is not observable. In any event substantially the same results in producing optically isotropic carbon are obtained as when the reaction is carried out in a sealed tube by means of a clearly discernable detonation.

Another procedure for practicing the invention involves using either a xenon flash lamp or an electric arc to cause the rapid exothermic reaction between the charge hydrocarbon and the hydrogen-abstracting reactant. For example, a sealed tube containing adamantane and a suitable amount of acetylene for absorbing the luminous radiation and for partial hydrogen abstraction, preferably with a reduced pressure in the tube such as 10–100 mm. Hg absolute, is placed within the helix of a xenon flash lamp. The lamp is flashed by discharging 400–1600 joules of energy from a capacitor bank. This causes a practically instantaneous reaction of the reaction mixture and results in a carbonaceous deposit on the walls of the tube. The deposit contains the desired optically isotropic crystalline carbonaceous materials. In place of the xenon flash lamp, electrodes placed within the tube and through which an arc can be discharged by means of a condenser bank can be utilized to supply the energy for initiating the reaction. Also in place of acetylene, any of the other hydrogen-abstracting reactants hereinbefore specified which will absorb radiation emitted by the source can be employed.

As previously stated a portion of the colorless crystalline product of the present process constitutes both diamond of cubic structure and diamond of hexagonal structure. In Debye Scherrer X-ray diffraction tests, strong reflections are seen at about 2.06 and 1.26 Angstroms, which values correspond to the strongest lines in the normal cubic diamond spectrum. Additionally reflections appear at about the following values which correspond to calculated interplanar spacings for hexagonal diamond: 1.499; 1.16; and 1.09 Angstroms. These X-ray diffraction results coupled with the facts that the Becke refractive index is slightly above 2.4 and the crystals are optically isotropic show that diamond is formed as a product of the reaction.

The major part of the colorless crystalline product is not diamond but is also optically isotropic or in other words will not cause rotation of polarized light. Most of this material will melt within the range of 350–1200° C. and the melting points of the crystals vary throughout the range with some melting at relatively low levels and others at relatively high levels. The infrared spectra of these crystals show that they do not contain any aromatic rings nor do they contain any double or triple bonds. They do contain some hydrogen bonded to the carbon atoms but the carbon to hydrogen ratio is much higher than in the case of aromatic hydrocarbons, for example higher than 3:1. The crystals have Becke reflective indexes generally above 1.7 but less than 2.4. These crystals are insoluble in such solvents as amyl acetate, benzene, carbon tetrachloride and concentrated sulfuric acid. As previously indicated these crystals are relatively hard material and at least some if not all of them are capable of scratching glass. This novel carbonaceous material thus has utility as an abrasive.

The following examples are illustrative of the invention:

*Example I*

A watch glass was placed on a hot plate and heated to a temperature above 350° C. Small pieces of trimethylenenorbornane (R.I.=1.54) in amount of 0.5–1.0 g. each were placed intermittently in the middle of the watch glass where melting immediately occurred to form a drop, each drop being allowed to evaporate into the surrounding air before the next piece of hydrocarbon was added. The temperature of the watch glass was such that nucleate boiling of the drops occurred. A portion of each drop converted to carbonaceous material which was left on the watch glass. After 100 g. of the hydrocarbon had been added in this manner, a residue amounting to about 100 mg. remained. The residue was washed with amyl acetate to remove most of the black material and about 10 mg. of colorless carbonaceous crystals were recovered. The size of the crystals varied from less than 10 microns up to about 70 microns. The crystals were optically isotropic. By observance first on the hot stage of an optical microscope and then under an electron microscope it was found that most of the crystalline material melted in the range of 350–1200° C. but that a portion of the material did not melt at the maximum temperature of this range. By Becke refractive index tests it was found that crystalline material at the crystal surfaces had a refractive index slightly above 2.4 corresponding to the known refractive index of diamond. The bulk of the crystalline material had refractive indexes distinctly below this value but above 1.7. Debye Scherrer X-ray diffraction patterns showed interplanar spacings characteristic for both cubic and hexagonal diamond. The patterns also included numerous other lines representing diffractions by the non-diamond portion of the crystalline material.

*Example II*

When adamantane (R.I.=1.568) was substituted for trimethylenenorbornane in a similar experiment to that of the foregoing example, substantially the same results were obtained.

*Example III*

Trimethylenenorbornane (150 mg.) was added to a Pyrex tube and the tube was filled with oxygen partly saturated with water and then was sealed. The amount of oxygen was about 20% of the stoichiometric amount required for reacting with all of the hydrogen of the hydrocarbon. The tube was heated to slightly above 270° C. during a time of 10 minutes, whereupon a sudden explosion occurred with a luminous flash. The tube was then cooled to room temperature and opened, and the carbonaceous residue (1.5 mg.) which had formed was scraped from the walls. Amyl acetate was used to remove most of the black material from the residue. About 10% of the residue was obtained as clear crystals which had essentially the same properties as described for the product in Example I. Diamond constituted about 10% of the colorless crystalline material.

*Example IV*

Another run was made in essentially the same manner as in Example III but substituting adamantane for trimethylenenorbornane. Substantially the same results were obtained. The Debye Scherrer X-ray diffraction pattern of the colorless crystalline product is given in the following table, along with the theoretical interplanar spacings ($d$ in Angstrom units) for both cubic and hexagonal diamond.

TABLE.—DEBYE SCHERRER LATTICE REFLECTIONS
[$d$, angstroms]

| Example VI Product | Hexagonal Diamond | Cubic Diamond |
| --- | --- | --- |
| 4.20 | | |
| 4.02 | | |
| 3.54 | | |
| 3.35 | | |
| 3.18 | | |
| 3.06 | | |
| 2.90 | | |
| 2.80 | | |
| 2.77 | | |
| 2.52 | | |
| 2.12 | | |
| 2.04 | 2.06 | 2.06 |
| 1.88 | | |
| 1.82 | | |
| 1.54 | | |
| 1.49 | 1.499 | |
| 1.39 | | |
| 1.25 | 1.26 | 1.26 |
| 1.22 | | |
| 1.18 | | |
| 1.15 | 1.16 | |
| 1.08 | 1.09 | |

In the table the correspondence of certain spectral lines with the theoretical values given for hexagonal and cubic diamond is within the accuracy of the test method.

When other non-aromatic non-planar hydrocarbons having the various structural requirements herein specified are substituted for adamantane or trimethylenenorbornane, analogous results are obtained in producing optically isotropic crystalline carbonaceous material including diamond. Likewise when any of the other hydrogen-abstracting reactants are substituted for oxygen, similar results are obtained.

I claim:

1. Method of preparing optically isotropic crystalline carbonaceous material which comprises heating a non-aromatic non-planar hydrocarbon having at least two rings and at least one carbon atom common to said rings in the present of a vapor phase reactant selected from the group consisting of oxygen, sulfur, halogens, carbon dioxide, nitric oxide, acetylene and methylacetylene, the amount of said reactant being between 2% and 80% of the stoichiometric amount required for complete reaction with the hydrogen in said hydrocarbon, said hydrocarbon being heated to a temperature above 250° C. sufficient to initiate a rapid exothermic reaction, effecting such exothermic reaction in a time less than 50 milliseconds, whereby hydrogen atoms are removed from the hydrocarbon by reaction with said reactant, and recovering from the reaction mixture colorless crystalline carbonaceous material which is optically isotropic and which melts above 350° C., has a refractive index of at least 1.7 and a carbon to hydrogen ratio higher than 3:1, and is further characterized by the absence of aromatic rings, double bonds and triple bonds.

2. Method according to claim 1 wherein the amount of said reactant is between 10% and 30% of said stoichiometric amount.

3. Method according to claim 1 wherein said reactant is oxygen.

4. Method according to claim 3 wherein the amount of said rectant is between 10% and 30% of said stoichiometric amount.

5. Method according to claim 1 wherein said hydrocarbon is selected from the group consisting of adamantane, alkyladamantanes, trimethyleneorbornane and alkyltrimethylenenorbornanes.

6. Method according to claim 5 wherein said reactant is oxygen and the amount thereof is between 10% and 30% of said stoichiometric amount.

7. Method of preparing optically isotropic crystalline carbonaceous material which comprises detonating a non-aromatic non-planar hydrocarbon having at least two rings and at least one carbon atom common to said rings with oxygen, the amount of oxygen being at least sufficient to form a mixture within the explosive range but less than 80% of the stoichiometric amount required for complete reaction with the hydrogen in said hydrocarbon, such detonation being initiated at a temperature above 250° C., whereby hydrogen atoms are removed from the hydrocarbon by reaction with the oxygen, and recovering from the reaction mixture colorless crystalline carbonaceous material which is optically isotropic and which melts above 350° C., has a refractive index of at least 1.7 and a carbon to hydrogen ratio higher than 3:1, and is further characerized by the absence of aromatic rings, double bonds and triple bonds.

8. Method according to claim 7 wherein the amount of oxygen is between 10% and 30% of said stoichiometric amount.

9. Method according to claim 7 wherein said hydrocarbon is selected from the group consisting of adamantane, alkyladamantanes, trimethylenenorbornane and alkyltrimethylenenorbornanes.

10. Method according to claim 9 wherein said hydrocarbon is adamantane.

11. Method according to claim 9 wherein said hydrocarbon is trimethylenenorbornane.

12. Method of preparing optically isotropic crystalline carbonaceous material which comprises applying intermittently to a hot surface small portions of a non-aromatic non-planar hydrocarbon having at least two rings and at least one carbon atom common to said rings, the portions so applied being surrounded by an atmosphere containing a hydrogen-abstracting vapor selected from the group consisting of oxygen, sulfur, halogens, carbon dioxide, nitric oxide, acetylene and methylacetylene, said surface being heated to a temperature at which nucleate boiling of the hydrocarbon occurs, whereby hydrogen atoms are removed from at least a portion of the hydrocarbon leaving a carbonaceous deposit containing colorless crystalline carbonaceous material which is optically isotropic and which melts above 350° C., has a refractive index of at least 1.7 and a carbon to hydrogen ratio higher than 3:1, and is further characterized by the absence of aromatic rings, double bonds and triple bonds.

13. Method according to claim 12 wherein said hydrogen-abstracting vapor is oxygen.

14. Method according to claim 13 wherein said hydrocarbon is selected from the group consisting of adamantane, alkyladamantanes, trimethylenenorbornane and alkyltrimethylenenorbornanes.

15. Method according to claim 14 wherein said hydrocarbon is adamantane.

16. Method according to claim 14 wherein said hydrocarbon is trimethylenenorbornane.

17. Method according to claim 12 wherein said hydrocarbon is selected from the group consisting of adamantane, alkyladamantanes, trimethylenenorbornane and alkyltrimethylenenorbornanes.

18. Method of preparing optically isotropic carbonaceous matter including diamond which comprises heating a non-aromatic non-planar hydrocarbon having at least two rings and at least one carbon atom common to said rings in the presence of a vapor phase reactant selected from the group consisting of oxygen, sulfur, halogens, carbon dioxide, nitric oxide, acetylene and methylacetylene, said reactant being present in amount between 2% and 80% of the stoichiometric amount required for complete reaction with the hydrogen in said hydrocarbon, said hydrocarbon being heated to a temperature above 250° C. sufficient to initiate a rapid exothermic reaction, effecting such exothermic reaction in a time less than 50 milliseconds, whereby hydrogen atoms are removed from the hydrocarbon by reaction with said reactant and a product comprising isotropic carbonaceous material melting in the range of 350°–1200° C., having a refractive index between 1.7 and 2.4 and a carbon to hydrogen ratio higher than 3:1, and being further characterized by the absence of aromatic rings, double bonds, and triple bonds and diamond crystals is formed, and repeating said reaction in the presence of said product whereby the previously formed diamond crystals function as seeds for the growth of larger diamond crystals.

19. Method according to claim 18 wherein said reactant is oxygen.

20. Method according to claim 19 wherein said hydrocarbon is selected from the group consisting of adamantane, alkyladamantanes, trimethylenenorbornane and alkyltrimethylenenorbornanes.

21. Optically isotropic colorless crystalline carbonaceous material prepared according to claim 1 said carbonaceous material melting in the range of 350–1200° C., having a refractive index between 1.7 and 2.4 and a carbon to hydrogen ratio higher than 3:1, and being further characterized by the absence of aromatic rings, double bonds and triple bonds.

References Cited

FOREIGN PATENTS 629,218 10/1961 Canada.
665,745 6/1963 Canada.

OTHER REFERENCES

Marshall: "Man-Made Diamonds," G.E. Research Laboratory Publication, March 1955, pages 5–10.

Bridgman: "Scientific American," 193, November 1955, pages 42–46.

EDWARD J. MEROS, *Primary Examiner.*

OSCAR R. VERTIZ, *Examiner.*